(12) United States Patent  (10) Patent No.: US 9,131,005 B2
Bhogal et al.  (45) Date of Patent: Sep. 8, 2015

(54) BROKER DESIGNATION AND SELECTION IN A PUBLISH-SUBSCRIPTION ENVIRONMENT

(71) Applicant: International Business Machines Corporation, Armonk, NY (US)

(72) Inventors: Kulvir S. Bhogal, Pflugerville, TX (US); Rick A. Hamilton, II, Charlottesville, VA (US); Brian M. O'Connell, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/591,263

(22) Filed: Jan. 7, 2015

(65) Prior Publication Data

US 2015/0127742 A1    May 7, 2015

Related U.S. Application Data

(63) Continuation of application No. 13/591,540, filed on Aug. 22, 2012, now Pat. No. 8,990,301.

(51) Int. Cl.
*G06F 15/16* (2006.01)
*H04L 29/08* (2006.01)

(52) U.S. Cl.
CPC ........ *H04L 67/2809* (2013.01); *H04L 67/2842* (2013.01)

(58) Field of Classification Search
CPC ............ H04L 67/2809; H04L 67/2842; H04L 67/2852
See application file for complete search history.

(56) References Cited

U.S. PATENT DOCUMENTS

| 6,334,151 | B1 | 12/2001 | Bolam et al. |
|---|---|---|---|
| 7,162,524 | B2 | 1/2007 | Astley et al. |
| 7,437,417 | B2 | 10/2008 | Reynolds et al. |
| 8,019,816 | B2 | 9/2011 | Dorai et al. |
| 8,028,085 | B2 | 9/2011 | Elien et al. |
| 8,065,372 | B2 | 11/2011 | Reynolds et al. |
| 8,141,105 | B2 | 3/2012 | Roberts |
| 2006/0056628 | A1 | 3/2006 | Todd |
| 2007/0016910 | A1* | 1/2007 | Roberts .......... 719/313 |
| 2007/0043824 | A1* | 2/2007 | Fremantle ...... 709/214 |

(Continued)

OTHER PUBLICATIONS

Jonathan A. Bui, USPTO Office Action, U.S. Appl. No. 13/591,540, Notification Date May 30, 2014, 30 pages.

(Continued)

*Primary Examiner* — Jonathan Bui
(74) *Attorney, Agent, or Firm* — William E. Schiesser; Keohane & D'Alessandro PLLC; Maxine L. Barasch

(57) ABSTRACT

Approaches for designating and/or selecting broker systems in a publication-subscription (pub-sub) messaging environment are provided. In one approach, a subscriber system may be designated as a broker system based on a capability of the subscriber system to function as a broker system for its peers. In another approach, a broker system may be selected from among a plurality of broker systems based upon a cache directory that identifies the content/messages that each broker system may have cached. If a particular broker system has previously cached content that is at least similar to an intended message, that particular broker system may be selected for distributing the intended message to a set of subscriber systems.

20 Claims, 8 Drawing Sheets

(56) References Cited

U.S. PATENT DOCUMENTS

| | | |
|---|---|---|
| 2008/0133646 A1 | 6/2008 | Azulai |
| 2009/0228563 A1 | 9/2009 | Jones |
| 2010/0241717 A1* | 9/2010 | Hawkins et al. .............. 709/206 |
| 2011/0125921 A1 | 5/2011 | Karenos et al. |
| 2012/0030572 A1 | 2/2012 | Karenos et al. |
| 2012/0246219 A1* | 9/2012 | Bhogal et al. ................ 709/203 |
| 2012/0303725 A1 | 11/2012 | Sato et al. |
| 2013/0024529 A1 | 1/2013 | Gallant et al. |
| 2013/0060834 A1* | 3/2013 | Paramasivam et al. ....... 709/202 |

OTHER PUBLICATIONS

Jonathan A. Bui, USPTO Notice of Allowance and Fee(s) Due, U.S. Appl. No. 13/591,540, Date Mailed Nov. 7, 2014, 15 pages.

* cited by examiner

BROKER DESIGNATION AND SELECTION IN A PUBLISH-SUBSCRIPTION ENVIRONMENT

RELATED U.S. APPLICATION DATA

The present patent document is a continuation of U.S. patent application Ser. No. 13/591,540, filed Aug. 22, 2012, entitled "BROKER DESIGNATION AND SELECTION IN A PUBLISH-SUBSCRIPTION ENVIRONMENT", the disclosure of which is incorporated herein by reference.

TECHNICAL FIELD

Embodiments of the present invention relate to publish-subscription (pub-sub) environments. Specifically, embodiments of the present invention relate to approaches for designating and/or selecting broker systems in a publication-subscription (pub-sub) messaging environment.

BACKGROUND

Publish-subscription (pub-sub) messaging patterns are communication models used in many different industries today. For example, pub-sub is used in banking systems, weather systems, and other systems that require techniques to notify multiple entities of common information. In general, pub-sub is a messaging paradigm where senders (publishers) of messages typically are not programmed to send their messages to specific receivers (subscribers). Rather, published messages can be characterized into classes, without knowledge of what (if any) subscribers there may be. Subscribers express interest in one or more classes and can receive messages that are of interest, without knowledge of what publishers there are. This decoupling of publishers and subscribers can allow for greater scalability and a more dynamic network topology.

One challenge in pub-sub models is determining an efficient route for communicating messages to subscriber systems (e.g., from publisher systems). Oftentimes, such communications may occur via a broker system or the like. As such, selection of an appropriate/capable broker system may have a significant impact on the efficient delivery of the underlying messages.

SUMMARY

In general, embodiments of the present invention relate to approaches for designating and/or selecting broker systems in a publication-subscription (pub-sub) messaging environment. In one embodiment, a subscriber system may be designated as a broker system. Specifically, at least one subscriber system having a capability to function as a broker system will be identified. The capability of the subscriber system to provide such function may be determined based upon metadata stored in at least one computer memory medium. Once a capable subscriber system has been identified, such subscriber system may then be designated as a broker system (e.g., designated as a "subscriber/broker") so that a set of intended messages may be distributed by the newly designated broker system to other subscriber systems. In another embodiment, a broker system may be selected from among a plurality of broker systems based upon a set of selection criteria. Such selection criteria may include a cache directory that identifies content/messages that each broker system may have previously cached. If a particular broker system has previously cached content that is at least similar to an intended message, and the particular broker system has sufficient capacity, that particular broker system may be selected for distributing the intended message to a set of subscriber systems that are subscribed to receive the intended message.

A first aspect of the present invention provides a computer-implemented method for designating broker systems in a publish-subscription (pub-sub) messaging environment, comprising: determining a type of content received by a set of subscriber systems in the pub-sub messaging environment; identifying at least one subscriber system of the set of subscriber systems having a capability to function as a broker system with respect to other subscriber systems of the set of subscriber systems, the capability being determined based upon metadata stored in at least one computer memory medium; designating the at least one subscriber system as the broker system based on the capability; and sending a set of messages having the type of content to the broker system for distribution to the other subscriber systems.

A second aspect of the present invention provides at least one system for designating broker systems in a publish-subscription (pub-sub) messaging environment, comprising: at least one bus; at least one processor coupled to the at least one bus; and at least one memory medium coupled to the at least one bus, the at least one memory medium comprising instructions to: determine a type of content received by a set of subscriber systems in the pub-sub messaging environment; identify at least one subscriber system of the set of subscriber systems having a capability to function as a broker system with respect to other subscriber systems of the set of subscriber systems, the capability being determined based upon metadata stored in at least one computer memory medium; designate the at least one subscriber system as the broker system based on the capability; and send a set of messages having the type of content to the broker system for distribution to the other subscriber systems.

A third aspect of the present invention provides at least one computer program product for designating broker systems in a publish-subscription (pub-sub) messaging environment, the at least one computer program product comprising at least one computer readable storage media, and program instructions stored on the at least one computer readable storage media, to: determine a type of content received by a set of subscriber systems in the pub-sub messaging environment; identify at least one subscriber system of the set of subscriber systems having a capability to function as a broker system with respect to other subscriber systems of the set of subscriber systems, the capability being determined based upon metadata stored in at least one computer memory medium; designate the at least one subscriber system as the broker system based on the capability; and send a set of messages having the type of content to the broker system for distribution to the other subscriber systems.

A fourth aspect of the present invention provides a method for deploying a system for designating broker systems in a publish-subscription (pub-sub) messaging environment, comprising: providing at least one computer infrastructure being operable to: determine a type of content received by a set of subscriber systems in the pub-sub messaging environment; identify at least one subscriber system of the set of subscriber systems having a capability to function as a broker system with respect to other subscriber systems of the set of subscriber systems, the capability being determined based upon metadata stored in at least one computer memory medium; designate the at least one subscriber system as the broker system based on the capability; and send a set of messages having the type of content to the broker system for distribution to the other subscriber systems.

A fifth aspect of the present invention provides a computer-implemented method for selecting a message broker in a publish-subscription (pub-sub) messaging environment, comprising: analyzing a cache directory associated with a plurality of broker systems in the pub-sub environment, the cache directory identifying content stored in a set of cache memory units by the plurality of brokers; identifying a particular broker system of the plurality of broker systems for distribution of a set of messages from a publisher system to a set of subscriber systems, the particular broker system being identified based on a similarity of content stored in the set of cache memory units to an intended message to be distributed to the set of subscriber systems; and sending the intended message to the particular broker system.

A sixth aspect of the present invention provides at least one system for selecting a message broker in a publish-subscription (pub-sub) messaging environment, comprising: at least one bus; at least one processor coupled to the at least one bus; and at least one memory medium coupled to the at least one bus, the at least one memory medium comprising instructions to: analyze a cache directory associated with a plurality of broker systems in the pub-sub environment, the cache directory identifying content stored in a set of cache memory units by the plurality of brokers; identify a particular broker system of the plurality of broker systems for distribution of a set of messages from a publisher system to a set of subscriber systems, the particular broker system being identified based on a similarity of content stored in the set of cache memory units to an intended message to be distributed to the set of subscriber systems; and send the intended message to the particular broker system.

A seventh aspect of the present invention provides at least one system for selecting a message broker in a publish-subscription (pub-sub) messaging environment, the at least one computer program product comprising at least one computer readable storage media, and program instructions stored on the at least one computer readable storage media, to: analyze a cache directory associated with a plurality of broker systems in the pub-sub environment, the cache directory identifying content stored in a set of cache memory units by the plurality of brokers; determine a particular broker system of the plurality of broker systems for distribution of a set of messages from a publisher system to a set of subscriber systems, the particular broker system being identified based on a similarity of content stored in the set of cache memory units to an intended message to be distributed to the set of subscriber systems; and send the intended message to the particular broker system.

An eighth aspect of the present invention provides a method for selecting a message broker in a publish-subscription (pub-sub) messaging environment, comprising: providing at least one computer infrastructure being operable to: analyze a cache directory associated with a plurality of broker systems in the pub-sub environment, the cache directory identifying content stored in a set of cache memory units by the plurality of brokers; determine a particular broker system of the plurality of broker systems for distribution of a set of messages from a publisher system to a set of subscriber systems, the particular broker system being identified based on a similarity of content stored in the set of cache memory units to an intended message to be distributed to the set of subscriber systems; and send the intended message to the particular broker system.

BRIEF DESCRIPTION OF THE DRAWINGS

These and other features of this invention will be more readily understood from the following detailed description of the various aspects of the invention taken in conjunction with the accompanying drawings in which.

Figure 1:
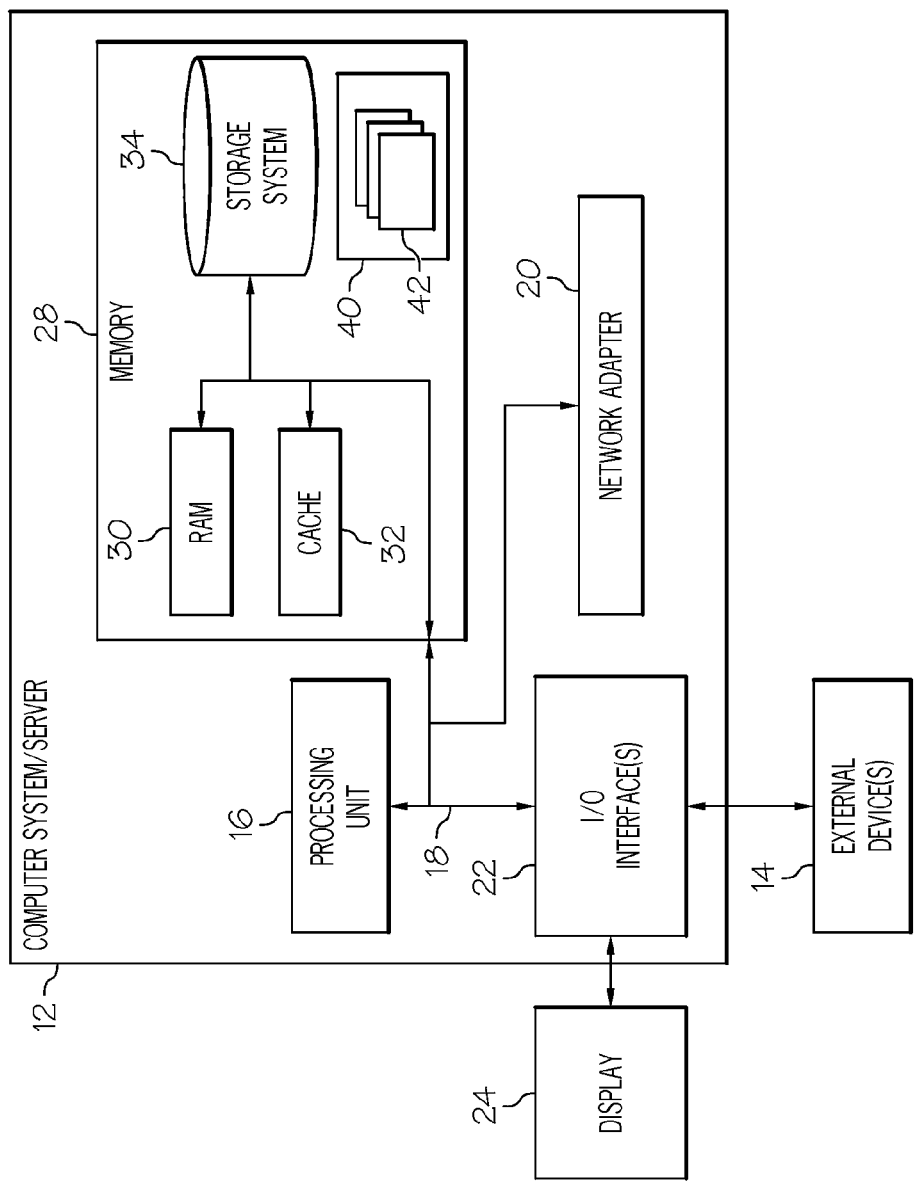
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The term "set" means a quantity of at least one. Moreover, where reference numbers include the letters "A-N," it is intended to me a plurality of items.

Embodiments of the present invention allow a subscriber system "peer" to be designated as a broker system for publishing to other subscriber systems. This may involve the broker system determining what subscriber systems are receiving a certain type of content, and then designating a certain subscriber system as a broker system for other geographically collocated subscriber systems to reduce transmission time. Adding another communication "hop" in this manner would reduce server load/cost to operate. This subscriber/broker system (also referred to herein as the designated broker system) may perform caching at its own level to improve efficiency. In some embodiments, a subscriber system may opt in to become a broker/subscriber system. The primary broker system may intentionally delay transmission of messages to those subscriber systems that have not opted in to become a broker/subscriber system. It may also be beneficial to the primary broker system to have many broker/subscriber "children" systems available to reduce load. Therefore, a delay for those subscriber systems that do not opt-in may motivate individuals to assist the broker system by opting in.

Embodiments of the present invention further allow a publisher system to select a particular broker system from a plurality of brokers system for receiving a message to be distributed to/passed on to applicable subscriber systems. The selection process may be based on a set of factors/criteria such as broker system availability, geographic proximity of a candidate broker system to applicable/subscribing subscriber system(s), and what data a broker system may have previously cached (and thus be a good candidate to receive a new, abbreviated message that may have included similar data). Likewise, a broker system may advertise to a cache directory on the contents of the broker system's cache. If a publisher system is submitting a new/intended message for publication that is unlike a previous message, the publisher system may select a broker system with the most free cache space, as to not remove cache entries from another broker system that another publisher system may still find useful.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. In general, program/utility 40 performs the function of the present invention as described herein. Each of the operating systems, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22.

Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
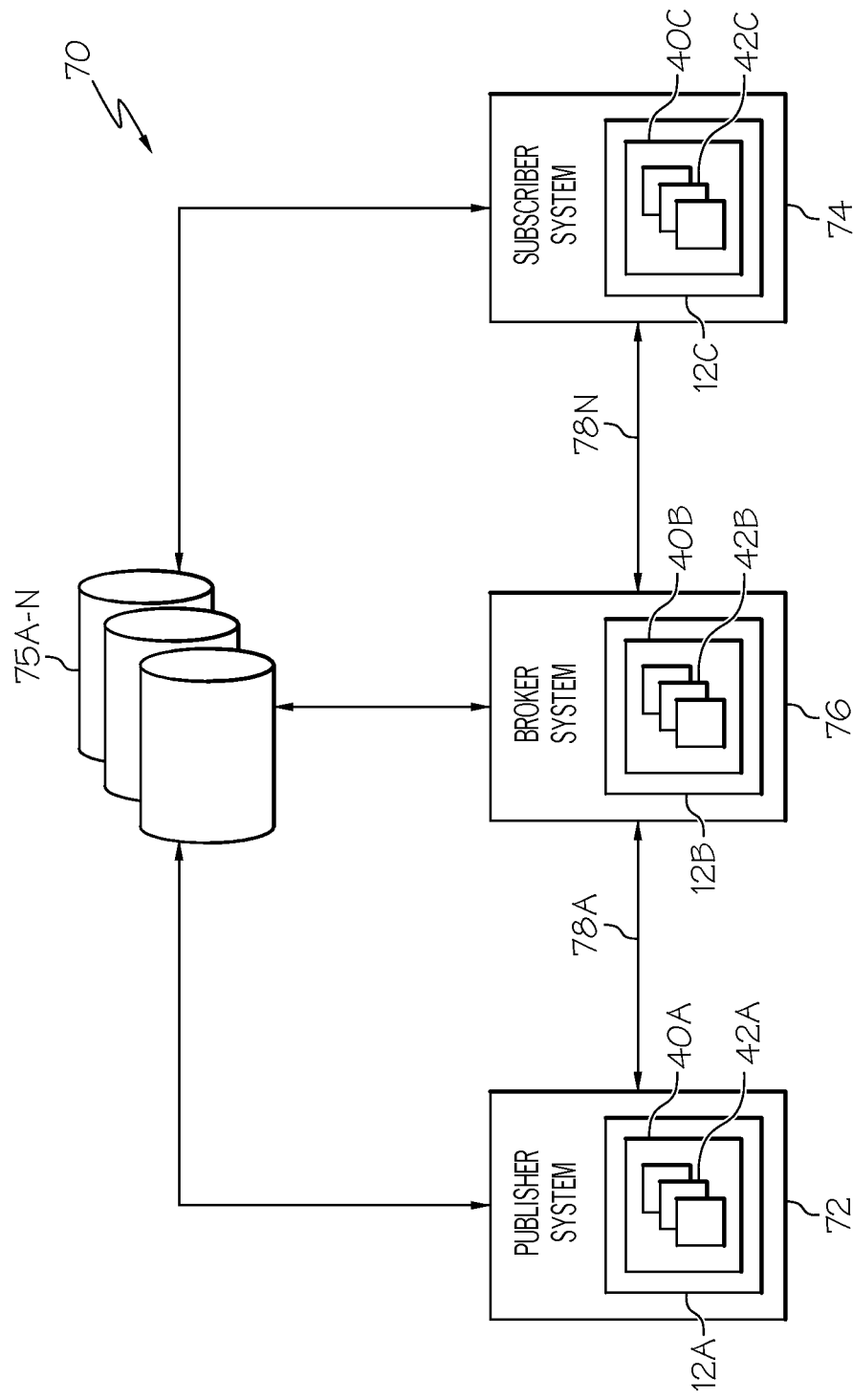
FIG. 2 depicts a pub-sub environment according to an embodiment of the present invention.

Embodiments of the present invention provide an approach for a shared cache that can be utilized to reduce the volume of data (network traffic) delivered to individual subscribers in a pub-sub system. Referring now to FIG. 2, a pub-sub environment 70 in accordance with at least one embodiment of the present invention is shown in greater detail. As depicted, environment 70 comprises a publisher system 72 (also referred to below as "publisher") in communication with a subscriber system 74 (also referred to below as "subscriber") via a broker system 76 (also referred to below as "broker"). Systems 72, 74, and 76 communicate via network links 78A-N, which can represent any type of network links and/or communication networks now known or later developed. It is understood that publisher system 72, subscriber system 74, and broker system 76 each comprise one or more computer systems 12A-C (e.g., which comprise components/elements similar to computer system 12 of FIG. 1). As such, publisher system 72, subscriber system 74, and broker system 76 can each comprise a program/utility 40A-C that enable corresponding functions thereof. Specifically, publisher system 72 comprises publisher program 40A having a set (at least one) of publisher program modules 42A, broker system 76 comprises broker program 40B having a set of broker program modules 42B, and subscriber system 74 comprises a subscriber program 40C having a set of subscriber program modules 42C. Program modules 42A-C of programs 40A-C typically enable/perform the functions that will be described below in conjunction with FIGS. 3-8. As further shown, one or more caches 75A-N (e.g., for content such as messages) may be provided. In one embodiment, a shared cache may be utilized hereunder.

As will be further described below, pub-sub system 70 can generally enable one or more of the following operations: determine a type of content received by a set of subscriber systems in the pub-sub messaging environment (e.g. based upon a set of messages previously send to the set of subscriber systems); identify at least one subscriber system of the set of subscriber systems having a capability to function as a broker system with respect to other subscriber systems of the set of subscriber systems, the capability being determined based upon metadata stored in at least one computer memory medium (e.g., metadata being received via a scan of the set of subscriber systems for the set of metadata, a query of the set of subscriber systems, etc.); designate the at least one subscriber system as the broker system based on the capability; send a set of messages having the type of content to the broker system for distribution to the other subscriber systems; analyze a cache directory associated with a plurality of broker systems in the pub-sub environment, the cache directory identifying content stored in a set of cache memory units by the plurality of brokers; identify a particular broker system of the plurality of broker systems for distribution of a set of messages from a publisher system to a set of subscriber systems, the particular broker system being identified based on a similarity of content stored in the set of cache memory units to an intended message to be distributed to the set of subscriber systems (and/or a geographic proximity to the set of subscriber systems); and/or send the intended message to the particular broker system.

Figure 3:
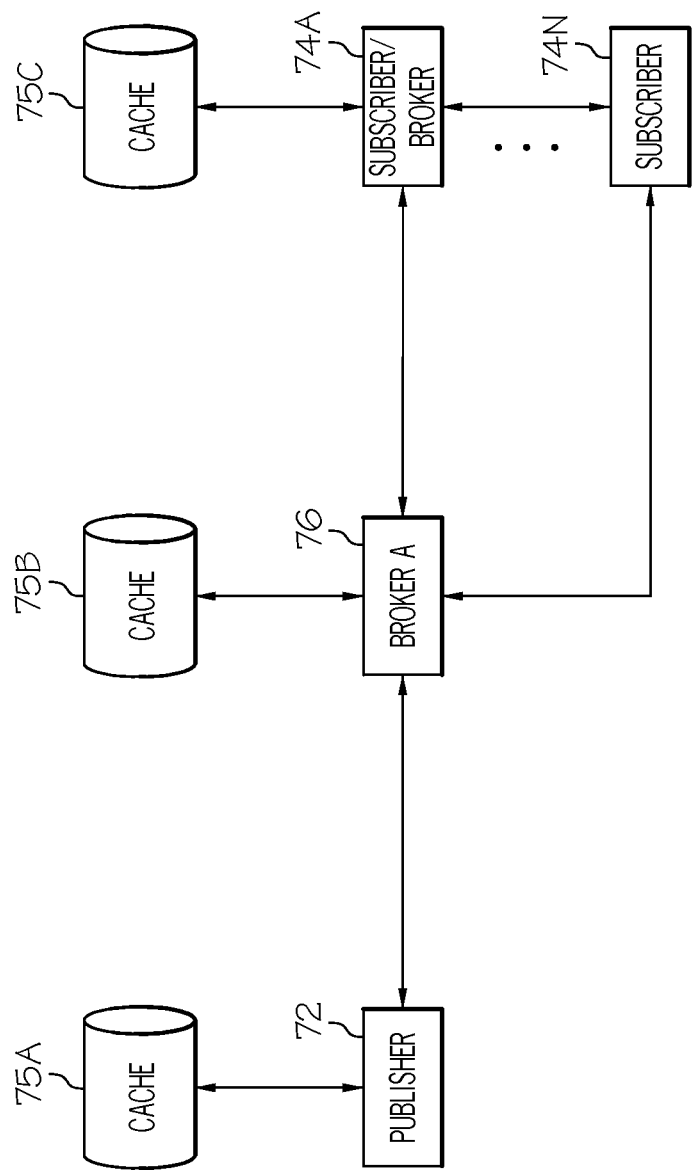
FIG. 3 depicts a system diagram according to an embodiment of the present invention.
Figure 4:
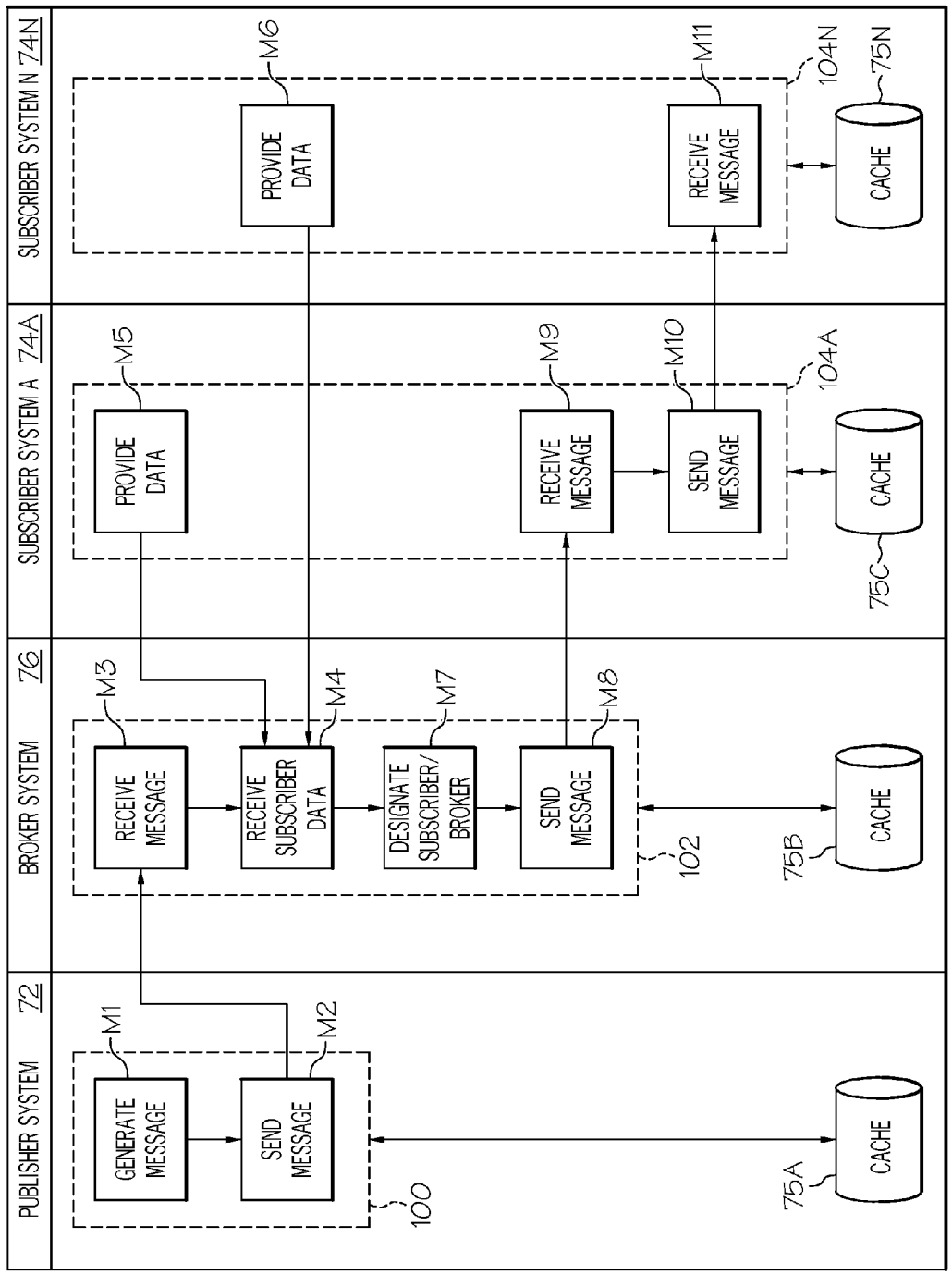
FIG. 4 depicts a component flow diagram according to an embodiment of the present invention.
Figure 5:
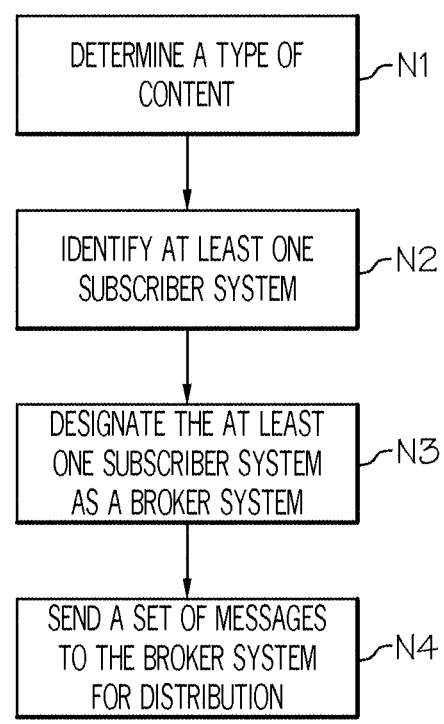
FIG. 5 depicts a method flow diagram according to an embodiment of the present invention.

Regardless, one embodiment of the present invention allows a subscriber peer to be designated as a broker for publishing to other subscribers. An example of this embodiment is illustrated in FIGS. 3-5. Referring first to FIG. 3, a system diagram according to this embodiment is shown. As depicted, FIG. 3 shows a publisher system 72 communicating with a broker system 76. Further, broker system 76 communicates with a set of subscriber systems 74A-N. Still yet, any of the systems 72, 74A-N (A-N being used to indicate a plurality of items), and/or 76 of FIG. 3 may communicate with and/or utilize one or more cache memory units 75A-C.

In general, the system of FIG. 3 allows broker system 76 to determine which subscriber systems 74A-N have historically received a certain type of content (e.g., based on previous messages or the like stored in a computer memory medium, databases, cache memory units 75A-C, etc.), and then designate a particular subscriber system 74A as a broker system for other geographically collocated subscriber systems 74B-N to reduce transmission time (wherein B-N is intended to be indicative of a plurality of other subscriber systems). This may be accomplished in multiple ways. For instance, broker system 76 may scan for either openly readable metadata, or for restricted metadata, about subscriber systems 74A-N. Subscriber systems 74A-N may conversely periodically push metadata about itself to broker system 76. Still yet, broker system 76 may query subscriber systems 74A-N to obtain an active response. Information requested could include geographical specifics, throughput capacity, information on current queues, and other capabilities that may guide a determination about the ability of one of subscriber systems 74A-N to become a "subscriber/broker" (which subscriber system 74A has become in the example shown in FIG. 3).

It is understood that while the designation of a subscriber system as a broker system may introduce another hop/step in the communication process, such designation should not increase transmission propagation time. Rather, additional efficiency provided by reduced server load, geographic proximities, and reduced operational costs will typically account for any transmission time differences. Moreover, subscriber/broker system 74A may perform caching at its own level (e.g., via cache 75C) to be improve efficiency. In some embodiments, a subscriber system may opt in (or out) to become a broker/subscriber. Primary broker system 76 may intentionally delay the transmission of messages to subscriber systems that have not opted in to become a broker/subscriber system.

It may also be beneficial to the primary broker system 76 to have multiple broker/subscriber "children" available to reduce communications loads. As such, a delay for the subscriber systems that do not opt in may motivate other subscriber systems to assist the broker by opting in. Alternatively, pricing mechanisms may be created to allow subscriber systems to still receive minimal content latency without service as a broker/subscriber. In this case, designation as a broker/subscriber system 74A may be considered the standard operating procedure. Information recipients may pay a premium price to opt out of the need to perform this dual purpose role, where charges may be incurred by time period (e.g., day, month, or year); by data quantity received (e.g., kilobyte, gigabyte, terabyte, etc.); or by messages received, etc. In this event, the network may accommodate new broker/subscriber systems. However, a premium service may allow subscriber systems to function solely as (legacy styled) message subscribers.

Referring now to FIG. 4, a component flow diagram according to an embodiment of the present invention is shown. As depicted, FIG. 4 shows communications between publisher system 72 having publisher engine 100, broker system 76 having broker engine 102, subscriber/broker system 74A having subscriber/broker engine 104A, and subscriber system 74N having subscriber engine 104N. Engines 100, 102, 104A-N generally implement and/or enable the underlying functions of each respective system. Moreover, engines 100, 102, and 104A-N may be implemented as, or work in conjunction with, program 40 of FIG. 1 (and/or programs 40A-C of FIG. 2). As further shown, each system may optionally utilize one or more cache memory units 75A-N.

In step M1, publisher system 72 will generate a message that is sent to broker system 76 in step M2. Upon receiving the message in step M3, broker system 76 will attempt to designate a subscriber system (e.g., 74A-N) as a broker/subscriber system in step M4. In so doing, subscriber data (e.g., metadata pertaining to capacities, geographic locations, throughput capacity, messages previous cached, etc.) will be provided in steps M5 and M6 (e.g., received in a computer memory medium or the like of broker system 76). The subscriber data will be analyzed and processed so that a particular subscriber system may be designated as a subscriber/broker system in step M7. This determination may be based upon the metadata (e.g., which subscriber system is most "capable" to function as a broker system). Once a designated broker system 74A has been determined, the message may be sent thereto in step M8. Upon receiving the message in step M9, designated broker system 74A will distribute the same to applicable subscriber systems such as subscriber system 74N in step M10. This message will be received and utilized by subscriber system 74N in step M11. It is understood that although the designation of a subscriber system as a broker system is described as being performed by broker system 76 (e.g., engine 102), this need not be the case. Rather such functionality could be performed by publisher system 72 (e.g., engine 100)

In sending and receiving messages, any of the systems of FIG. 4 may utilize cache memory units 75A-N to store content. Such storage may be helpful in the event a future message is generated with similar or common content to a previous message. In such a case, an entire newly generated message need not be sent. Rather, a system may send the parts of the newly generated message that are not in common with content previously cached. This reduces transmission time, bandwidth, etc. Example(s) of how a caching operation may be implemented hereunder will be described below.

Referring now to FIG. 5, a method flow diagram according to an embodiment of the present invention is shown. As depicted, in step N1, a type of content received by a set of subscriber systems in the pub-sub messaging environment is determined. In step N2, at least one subscriber system of the set of subscriber systems having a capability to function as a broker system with respect to other subscriber systems of the set of subscriber systems is determined (the capability being determined based upon metadata stored in at least one computer memory medium). In step N3, the at least one subscriber system is designated as the broker system based on the capability. In step N4, a set of messages having the type of content is sent to the broker system for distribution to the other subscriber systems.

Figure 6:
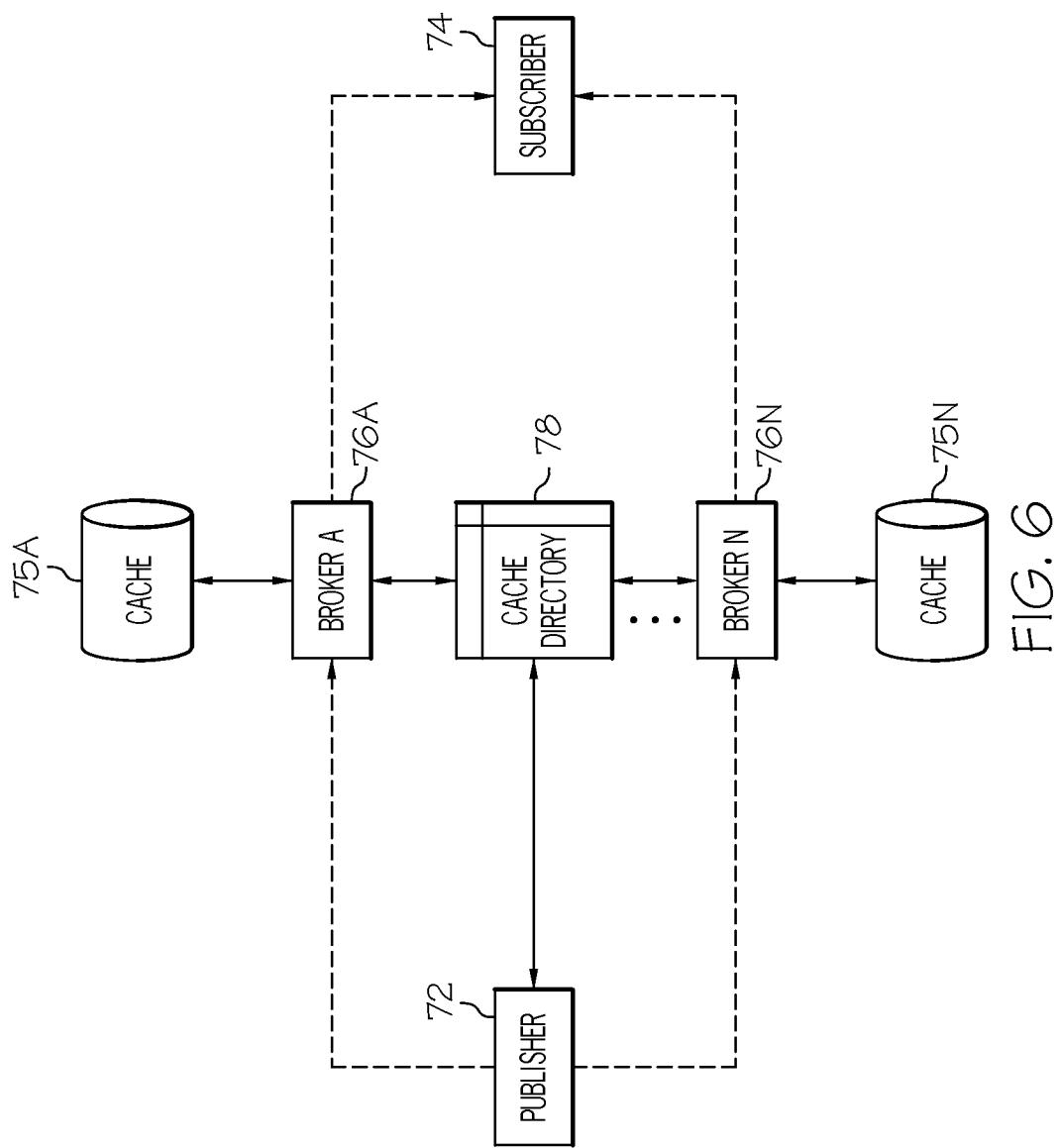
FIG. 6 depicts another system diagram according to an embodiment of the present invention.

Referring now to FIG. 6, a system diagram according to another embodiment of the present invention is shown. In general, the system of FIG. 6 allows for a broker system to be selected from among a plurality of broker systems 76A-N for distribution of an intended message or the like. That is, embodiments of the present invention allow a publisher system 72 to select a particular broker system (e.g., broker system 76A) from a plurality of broker systems 76A-N for receiving a message to be passed on to applicable subscriber system(s) 74.

The selection of a particular broker system 76A may be based on a set of factors/criteria such as broker system availability, geographic proximity to subscriber(s), and what data a broker system may have previously cached (and thus be a good candidate to receive a new, abbreviated message that would have included the same data). Likewise, broker systems 76A-N may write to a cache directory 78 regarding how full their cache memory unit(s) 75A-N are. If publisher system 72 is submitting a new intended message for publication that is unlike a previous message, publisher system 72 may opt for a broker system with the most free cache space, as to not remove cache entries from another broker system that another publisher system may wish to utilize.

In general, broker selection may occur through multiple techniques. In one instance, publisher system 72 may query broker system 76A-N to learn of the applicable criteria, and broker systems 76A-N may respond in an active fashion. In another instance, broker systems 76A-N may periodically write their status and criteria into open registers that may be read by any publisher system 72. In yet another instance, broker systems 76A-N may periodically update its status, conveying the information directly back to publisher system 72.

Figure 7:
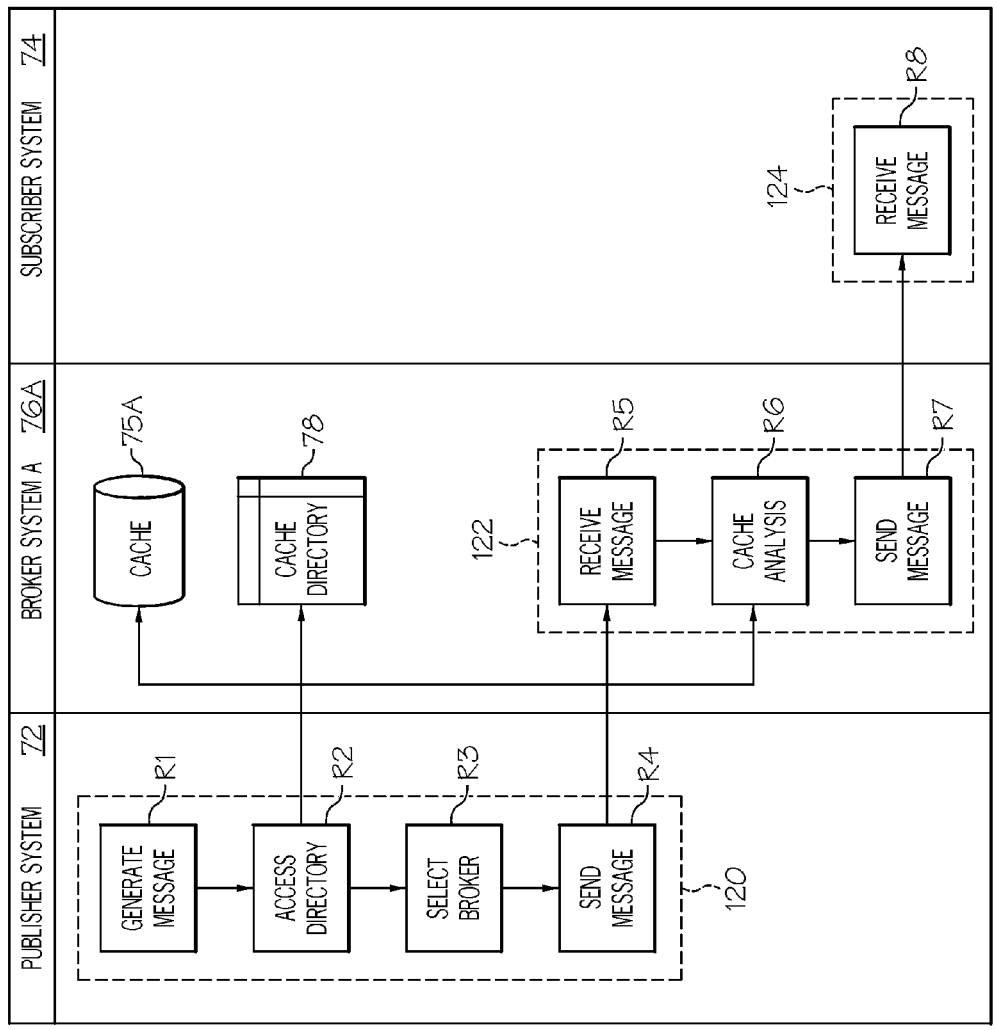
FIG. 7 depicts another component flow diagram according to an embodiment of the present invention.

Referring now to FIG. 7, a component flow diagram according to an embodiment of the present invention is shown. As depicted, FIG. 7 shows communications between publisher system 72 having publisher engine 120, broker system 76A having broker engine 122, and subscriber system 74N having subscriber engine 124. Engines 120, 122, and 124 generally implement and/or enable the underlying functions of each respective system. Moreover, engines 120, 122, and 124 may be implemented as, or work in conjunction with program 40 of FIG. 1 (and/or programs 40A-C for FIG. 2). As further shown, each system may optionally utilize with one or more cache memory units such as cache memory unit 75A.

In step R1, publisher system 72 will generate a message and then access a cache directory 78 in step R2. This access is to find an appropriate broker for publishing the generated message. Based on a set of criteria such as what each available broker system has cached (e.g., previous messages stored in cache memory unit 75A as indicated in cache directory 78, publisher system 72 will select a particular broker system such as broker system 76A in step R3, and then send the message thereto in step R4. Upon receiving the message in step R5, broker system 76A may perform a cache analysis to see if a previous version with similar content was previously cached in step R6. As indicated below, this may be used to send an abbreviated message to reduce bandwidth consumption and the like. In any event, the intended message will be sent to applicable subscriber systems 74 in step R7 where it may be received in step R8.

Figure 8:
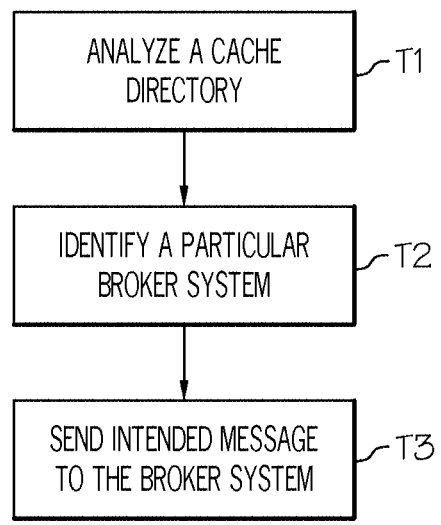
FIG. 8 depicts another method flow diagram according to an embodiment of the present invention.

Referring now to FIG. 8, a method flow diagram according to an embodiment of the present invention is shown. In step T1, a cache directory associated with a plurality of broker systems in the pub-sub environment is analyzed, the cache directory identifying content stored in a set of cache memory units by the plurality of brokers. In step T2, a particular broker system (of the plurality of broker systems) is identified for distribution of a set of messages from a publisher system to a set of subscriber systems, the particular broker system being identified based on at least one of the following: a similarity of content stored in the set of cache memory units to an intended message to be distributed to the set of subscriber systems, broker availability, or geographic proximity to the set of subscriber systems. In step T3, the intended message is sent to the particular broker system.

Data Caching

It is understood that the teachings recited herein may be performed in conjunction with any data caching operations to facilitate and/or make more efficient a message publication-subscription implementation (e.g., carried out by publishers, brokers, and/or subscribers). Shown below are illustrative implementations for caching data hereunder. It is understood that these examples are intended to be illustrative only and are non-exhaustive.

Illustrative Implementation I

As a broker system identifies data to be cached, the broker system may create a message that contains data that should be in the subscriber/client's cache, an applicable system/engine may either delete or substitute the cached data with the appropriate cache key (the system that allows for the data to be deleted is described below). For example, assume that the message being sent appears as follows:

AAAAAABBBBBBBCCCCCCDDDDDDEEEEEE

The broker system indicates that the "B's" of the message will likely be used in future messages and instructs subscribers (both publishers and subscriber systems) that both should retain the portion in their local cache. In this example, the broker system informs subscriber that they need to refer to this portion BBBBBBB as ~rp1. How to identify repeated portions will be user specifiable, and the escape sequences to identify repeated portions will be user specifiable as well. The subscriber will store the portion BBBBBBB and analyze incoming messages for the presence of ~rp1.

Further assume that at some future point in time, a publisher wants to send a message that appears as follows:

FFFFFFFFBBBBBBBUUUUUUJJJJJJJ

Rather than sending this message, it can now send the following:

FFFFFFFF~rp1UUUUUUJJJJJJJ

This allows for the sender to send less traffic on the network. Upon receipt of this message, the subscriber will then reconstruct the message based on translation information from its cache and create the following message:

FFFFFFFFBBBBBBBUUUUUUJJJJJJJ

After expanding ~rp1 to BBBBBBB.

Illustrative Implementation II

If it was desired, for example, that cached data be inserted at the 12th position of the message, then a property (or custom header) would be provided that indicates rp1=12,x,y (where rp1 is the cache key, and 12 is the first position to insert the data, x is the next, y is the next, and so on). This method prevents having to escape any un-cached message data that matches a cache indicator.

Illustrative Implementation III

Another possible storage key mechanism is the use of Cyclic Redundancy Check (CRC) or similar technologies. By publishing the repeating data field, and an indication that this is a repeating (e.g., cacheable) field, the broker system may likewise either send the CRC or allow the subscriber system to calculate that data field's CRC. Subsequent cache retrieval instructions can be made by using this CRC as a unique identifier of the cacheable data to be retrieved.

Under embodiments of the present invention, multiple approaches may be included in these solutions. Specifically, several techniques may be implemented to identify cacheable information. The techniques identified below may be used independently or in conjunction with each other.

Differencing Engine: This approach analyzes messages either within a single topic, or across multiple topics, capturing the similarities between messages. The most similar aspects of the messages are good candidates for future caching. The similarities captured may be persisted across restarts such that caching efficiency is not interrupted. The items cached may change over time as the message profiles change. For example, if one type of message is dominant for a period of time, then a second disparate message type is dominant, cache entries related to the first type may be invalidated to make room for the second type.

Rate-Based Selection: It may be common for some messages and topics to have a higher rate of publishing than others. This rate may be related to the importance or the dynamic nature of the subject for each particular topic. Topics with a higher publication rate should be selected for caching before topics with a lower publication rate. Rate-based selection counts the total number of messages per topic, or message types within a single topic, and selects the most published topics or message types for message portion caching.

Message Correlation Selection: The system may discern correlations between related topics and therefore cache the potential similarities for the related topics upon detection of the first message. For example, there may be related topics of /scores/[court]/and /stats/[court] where court is a changing topic related to particular players on a particular cart. Every message published to a /stats/[court] is preceded by a message published to a /scores/[court]. Both sets of messages may identify the player names for that particular court. Therefore, this method may discern for every message published to a /scores/[court] and a /stats/[court] that while components of the message change (current score, current stats) the player names stay the same. Therefore, for a short period of time after a message is published to a /scores/[court] the player name component is eligible for caching until the corresponding /stats/[court] message is sent.

Finally, it is also noted that different methods of signifying data entities may be used by both senders and recipients of data. These methods include universal hashing, hashing with checksums, rolling hashes, or even cryptographic hash functions, should security dictate. Each of these approaches offers certain advantages and can be used to speed and ease the implementation of any concepts described in this disclosure.

While shown and described herein as broker designation and/or selection solution, it is understood that the invention further provides various alternative embodiments. For example, in one embodiment, the invention provides a computer-readable/useable medium that includes computer program code to enable a computer infrastructure to provide broker designation and/or selection functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1)

(e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide broker designation and/or selection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing broker designation and/or selection functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for designating broker systems in a publish-subscription (pub-sub) messaging environment, comprising:
   determining a type of content received by a set of subscriber systems in the pub-sub messaging environment;
   identifying at least one subscriber system, not currently designated as a broker system, of the set of subscriber systems having a capability to function as the broker system with respect to other subscriber systems of the set of subscriber systems, the capability being determined based upon a set of metadata stored in at least one computer memory;
   designating the at least one subscriber system as the broker system based on the capability;
   sending a set of messages having the type of content to the broker system for distribution to the other subscriber systems;
   determining, by the broker system, a portion of content of a message of the set of messages, which is likely to appear in future messages; and
   notifying the other subscriber systems, by the broker, that the portion of content will be designated by a cache key.

2. The computer-implemented method of claim 1, the type of content being determined based upon a set of messages previously sent to the set of subscriber systems.

3. The computer-implemented method of claim 1, further comprising:
   storing, by the other subscriber systems, the portion of content in a cache; and
   analyzing incoming messages, by the other subscriber systems, for the cache key.

4. The computer-implemented method of claim 3, further comprising:
   receiving, at the other subscriber systems a message, containing the cache key, from the broker system; and
   reconstructing, by the other subscriber systems, the message contents by inserting the cached data in place of the cache key.

5. The computer-implemented method of claim 1, further comprising receiving the set of metadata by one of: (a) scanning the set of subscriber systems for the set of metadata, (2) in response to a query of the set of subscriber systems, or (3) receiving direct communication from the set of subscriber systems.

6. The computer-implemented method of claim 1, the set of subscriber systems being further identified based on a geographic location of each of the set of subscriber systems.

7. The computer-implemented method of claim 1, the capability being based upon at least one of the following: geographical specifics of the set of subscriber systems, throughput capacities of the set of subscriber systems, or information on current messaging queues of the set of subscriber systems.

8. The method of claim 1, wherein a service solution provider provides a computer infrastructure that performs the method for one or more consumers.

9. At least one system for designating broker systems in a publish-subscription (pub-sub) messaging environment, comprising:
   at least one bus;
   at least one processor coupled to the at least one bus; and
   at least one memory device coupled to the at least one bus, the at least one memory device comprising instructions to:

determine a type of content received by a set of subscriber systems in the pub-sub messaging environment;

identify at least one subscriber system, not currently designated as a broker system, of the set of subscriber systems having a capability to function as the broker system with respect to other subscriber systems of the set of subscriber systems, the capability being determined based upon a set of metadata stored in at least one computer memory;

designate the at least one subscriber system as the broker system based on the capability;

send a set of messages having the type of content to the broker system for distribution to the other subscriber systems;

determine, by the broker system, a portion of content of the set of messages, which is likely to appear in future messages; and notifying the other subscriber systems, by the broker, that the portion of content will be designated by a cache key.

10. The at least one system of claim 9, the type of content being determined based upon a set of messages previously sent to the set of subscriber systems.

11. The at least one system of claim 9, the at least one memory device further comprising instructions to:
store, by the other subscriber systems, the portion of content in a cache; and
analyze incoming messages, by the other subscriber systems, for the cache key.

12. The at least one system of claim 9, the at least one memory device further comprising instructions to:
receive, at the other subscriber systems a message, containing the cache key, from the broker system; and
reconstruct, by the other subscriber systems, the message contents by inserting the cached data in place of the cache key.

13. The at least one system of claim 9, the metadata being received by one of: (a) scanning the set of subscriber systems for the set of metadata, (2) in response to a query of the set of subscriber systems, or (3) receiving direct communication from the set of subscriber systems.

14. The at least one system of claim 9, the capability being based upon at least one of the following: geographical specifics of the set of subscriber systems, throughput capacities of the set of subscriber systems, or information on current messaging queues of the set of subscriber systems.

15. At least one computer program product for designating broker systems in a publish-subscription (pub-sub) messaging environment, the at least one computer program product comprising at least one computer readable storage device, and program instructions stored on the at least one computer readable storage device, to:

determine a type of content received by a set of subscriber systems in the pub-sub messaging environment;

identify at least one subscriber system, not currently designated as a broker system, of the set of subscriber systems having a capability to function as a broker system with respect to other subscriber systems of the set of subscriber systems, the capability being determined based upon a set of metadata stored in at least one computer memory;

designate the at least one subscriber system as the broker system based on the capability;

send a set of messages having the type of content to the broker system for distribution to the other subscriber systems;

determining, by the broker system, a portion of content of a message of the set of messages, which is likely to appear in future messages; and notifying the other subscriber systems, by the broker, that the portion of content will be designated by a cache key.

16. The at least one computer program product of claim 15, the type of content being determined based upon a set of messages previously sent to the set of subscriber systems.

17. The at least one computer program product of claim 15, the at least one memory device further comprising instructions to:
store, by the other subscriber systems, the portion of content in a cache; and
analyze incoming messages, by the other subscriber systems, for the cache key.

18. The at least one computer program product of claim 17, the at least one memory device further comprising instructions to:
receive, at the other subscriber systems, a message containing the cache key, from the broker system; and
reconstruct, by the other subscriber systems, the message contents by inserting the cached data in place of the cache key.

19. The at least one computer program product of claim 15, the metadata being received by one of: (a) scanning the set of subscriber systems for the set of metadata, (2) in response to a query of the set of subscriber systems, or (3) receiving direct communication from the set of subscriber systems.

20. The at least one computer program product of claim 15, the set of subscriber systems being further identified based on a geographic location of each of the set of subscriber systems.

* * * * *